Figure 1:
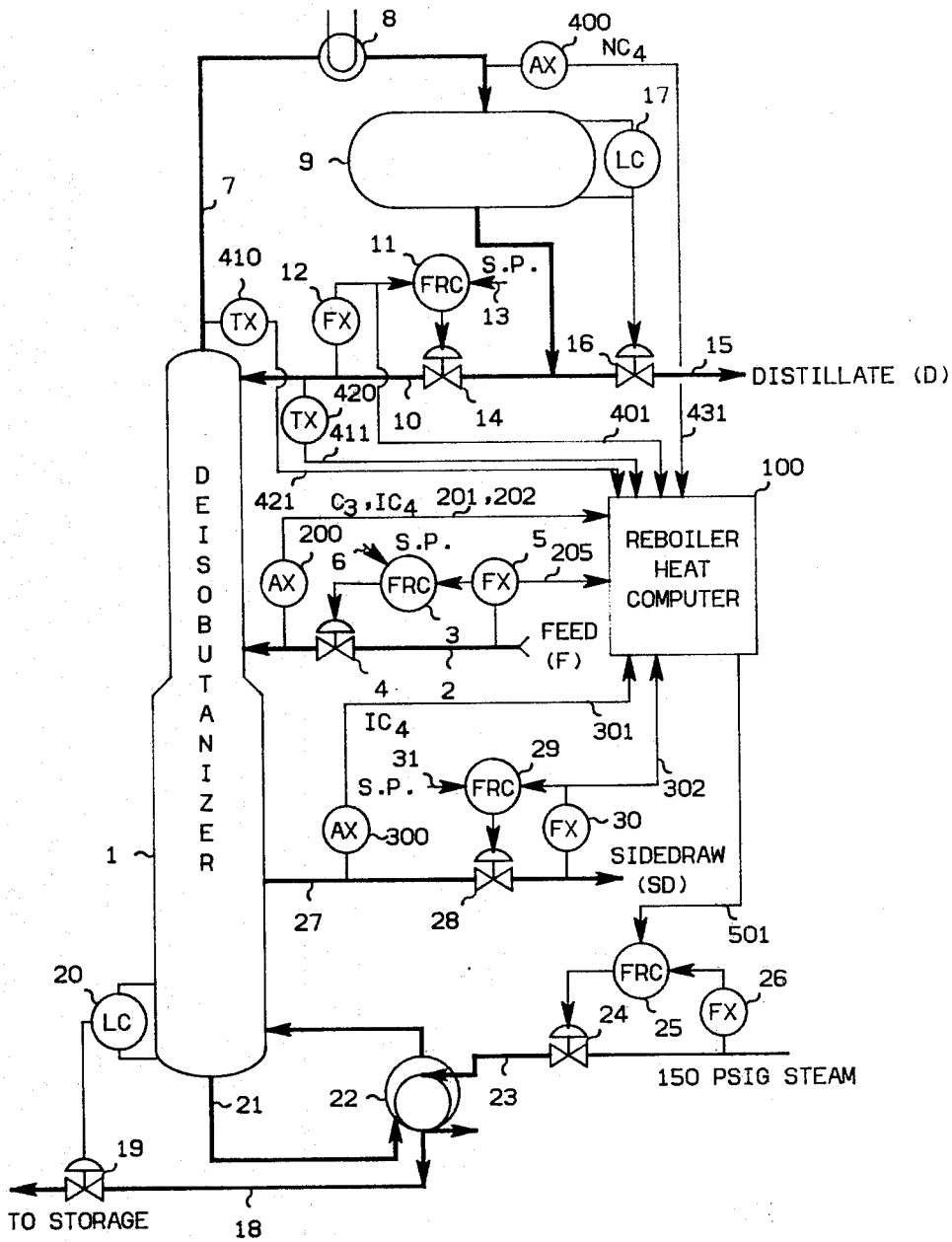

United States Patent [19]

Jensen

[11] 4,348,259
[45] Sep. 7, 1982

[54] CONTROL OF SIDEDRAW ON DISTILLATION COLUMN

[75] Inventor: Bruce A. Jensen, Bartlesville, Okla.

[73] Assignee: Phillips Petroleum Company, Bartlesville, Okla.

[21] Appl. No.: 195,698

[22] Filed: Oct. 9, 1980

[51] Int. Cl.³ ............................................. B01D 3/42
[52] U.S. Cl. .......................................... 203/1; 203/3;
 203/DIG. 19; 196/132; 202/160; 202/206;
 208/351; 208/DIG. 1; 364/501
[58] Field of Search ........................................ 203/1-3,
 203/DIG. 19, 99; 208/DIG. 1, 351; 202/160,
 206; 364/501; 585/800; 196/132

[56] References Cited

U.S. PATENT DOCUMENTS

| 3,212,997 | 10/1965 | Walker | 202/206 |
| 3,224,947 | 12/1965 | Lupter | 202/160 |
| 3,294,648 | 12/1966 | Lupter et al. | 203/3 |
| 3,296,097 | 1/1967 | Lupter | 202/206 |
| 3,405,035 | 10/1968 | Boyd | 203/2 |
| 3,411,308 | 11/1968 | Bellinger | 203/3 |
| 3,428,528 | 2/1969 | Oglesby et al. | 203/3 |
| 3,463,725 | 8/1969 | MacFarlane et al. | 203/3 |
| 3,840,437 | 10/1974 | Awan et al. | 202/206 |
| 4,262,791 | 4/1981 | Lynch et al. | 203/DIG. 19 |

Primary Examiner—Wilbur L. Bascomb, Jr.

[57] ABSTRACT

A control system for distillation column with a sidedraw line is provided wherein a prediction on the influence by changes in the feed stream with respect to the sidedraw composition is made.

19 Claims, 2 Drawing Figures

CONTROL OF SIDEDRAW ON DISTILLATION COLUMN

BACKGROUND OF THE INVENTION

This invention relates to the automatic control of distillation columns. More specifically, the invention relates to the control of such distillation columns having not only a feed input, overhead and bottom outlets, but also a sidedraw line. The invention relates both to the process and the apparatus aspects of this technology.

With computers and particularly microprocessors becoming more widely accessible and economically useful, a substantial development of automatic controls in the petrochemical industry has taken place. Especially mini-control systems for distillation columns have been developed. One such development is described in the U.S. Pat. No. 3,294,646. This patent describes the automatic optimization of bottoms and overhead flow of a distillation column by manipulating the heat input into the reboiler or the feed location (feed tray number) responsive to a control signal automatically computed from an analysis of the feed stream and other process variables. Whereas this patent is regarded to constitute a significant contribution to the art, it contains no solution of controlling a sidedraw stream from a distillation column so that the sidedraw is of approximately constant composition. This special problem arises in modern deisobutanizers, for instance.

THE INVENTION

It is thus one object of this invention to provide a distillation column control system useful for the control of the sidedraw composition of a distillation column.

A further object of this invention is to provide a fast-acting, feedforward control system for a distillation column equipped with a sidedraw line.

Yet another object of this invention is to provide a distillation column equipped with a computer control for maintaining the sidedraw flow of approximately constant composition.

Figure 2:
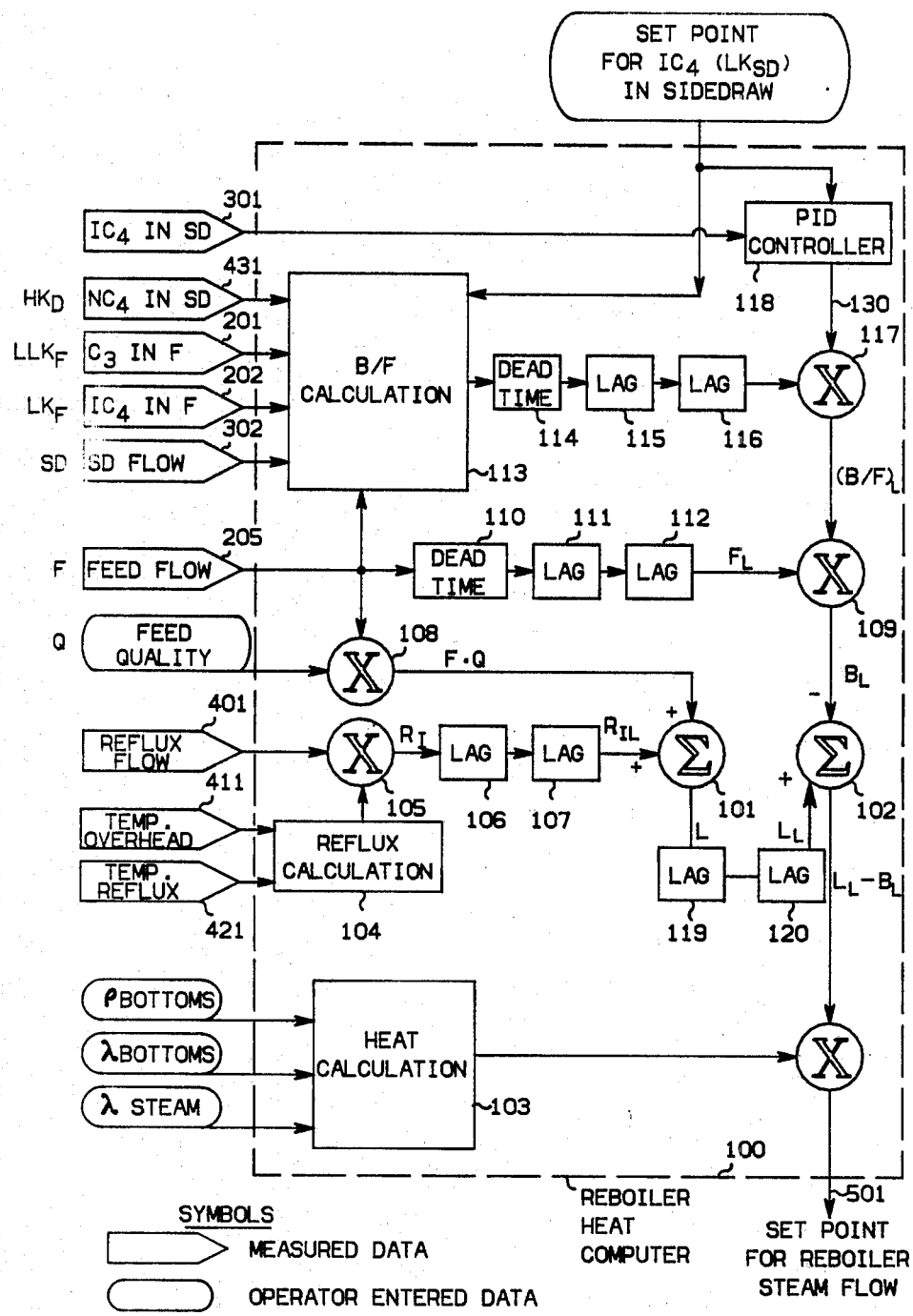

These and other objects, features, details, aspects, and embodiments of this invention will become apparent to those skilled in the art from the following detailed description of the invention, the appended claims and the drawing in which:

FIG. 1 schematically shows a distillation column with the control inputs and outputs, and FIG. 2 schematically shows the computer calculation logic of the invention.

In accordance with this invention, the composition of a sidedraw stream from a distillation column is controlled by calculating the bottom flow rate necessary for maintaining a desired sidedraw composition at a measured feed input and a measured actual sidedraw composition, and manipulating the bottom flow rate, the heat input into the column or both responsive to this calculation. The calculation is basically a material balance based on liquid flow into and from the distillation column taking the heat values of the liquid streams and the contents of these liquid streams of certain key components into consideration. Preferably, the calculation is simplified by making erroneous, but for the ultimate control system, harmless assumptions, as will be explained later.

The present invention in a first embodiment, therefore, resides in a method to control a fractionation tower in such a manner that changes in feed flow and/or feed composition of a multi-component feed stream will not affect the purity of a product stream that is withdrawn at a point intermediate between the feed stream and the bottom stream. The fractionation process of this invention comprises the steps of introducing a feed stream into a distillation column, withdrawing a side stream from the distillation column, withdrawing a bottom stream from the distillation column, and withdrawing an overhead stream from the distillation column. This process is improved in accordance with this invention by controlling the side stream. This control involves an automatic determination of the input of material into the distillation column by the feed stream and an automatic determination of the output of material from the distillation column via the overhead stream. The deviation of the sidedraw composition from a set point is automatically determined. Responsive to these measurements, a control signal is automatically calculated responsive to which one or both of the heat input to the distillation column and the flow of the bottom stream from the distillation column is manipulated so that the composition of the sidedraw stream remains essentially constant. This control system is essentially a feed forward control system in which from the composition and flow rate of the feed stream, a prediction is made on the influence of this feed stream's properties on the sidedraw. Responsive to this prediction counteracting manipulations as described are made.

Generally and preferably the flow rate and composition of the feed stream, the sidedraw stream and the distillate products stream are determined. It is usually sufficient to analyze the feed stream for two light key components, to analyze the overhead or distillate products stream for one heavy key component, and to analyze the sidedraw stream for one light key component.

Among the three different possibilities of manipulating process parameters of the distillation column, the manipulation of the heat input into the distillation column is presently preferred. This manipulation can simply be carried out by manipulating the heat input into a reboiler for the bottom liquids of the distillation column. The most common manipulation of heat input into a reboiler is the flow control of steam flow into a reboiler being heated by indirect heat exchange with such steam.

In a specific and presently preferred embodiment of this invention, the flow rate and composition of three streams are measured. These streams are the feed stream, the overhead or distillate stream and the sidedraw stream. The composition of these streams is measured by determining the concentration of at least one key component of these streams as indicated above. The control logic is based on a material balance calculation concerning the liquid entering the distillation column. This liquid entering the distillation column is composed of two components, namely the internal reflux and the liquid portion of the feed. Thus $$L = R_I + Q \cdot F$$

wherein L is the total liquid entering the column, e.g. in gallons/hour, $R_I$ is the internal reflux, e.g. in gallons/hours, F is the feed flow, e.g. in gallons/hour, and Q is a quality factor for the feed stream which is zero in case of the feed stream being entirely vaporous and is one in case of the feed stream being entirely liquid. This factor Q can be automatically determined and entered into the computerized computation but in many practical applications is a value that is entered by the operator and is only changed from time to time since the feed stream composition with respect to this factor Q does not change to any significant extent.

By a material balance calculation, the following equation is derived:

$$\frac{B}{F} = \frac{100 - LLK_F - LK_F - HK_D}{100 - LK_B - HK_D} - \frac{SD}{F} \cdot \frac{(100 - LK_{SD} - HK_D)}{(100 - LK_B - HK_D)}$$

In this equations, the abbreviations have the following meaning:
B: bottoms flow rate (gal/hr)
F: feedflow rate (gal/hr)
SD: sidedraw flow rate (gal/hr)
$LLK_F$: concentration in volume percent of the lighter than light key component in the feed stream
$LK_F$: concentration in volume percent of the light key component in the feed stream
$HK_D$: concentration in volume percent of the heavy key component in the distillate stream
$LK_B$: concentration in volume percent of the light key component in the bottoms stream
$LK_{SD}$: concentration in volume percent of the light key component in the sidedraw stream.

For varying feed compositions, with all other variables constant, the ratio B/F has a constant slope. Since the ratio is used for control purposes, this equation will be biased by an analyzer controler based upon the analysis of the concentration of the light key component in the sidedraw. Since this bias is back calculated from all variables when not on computer control, a simplification can be made by making $$LK_B = LK_{SD}$$

despite the fact that $$LK_B << LK_{SD}.$$

To repeat, the "erroneous" assumption is compensated for in the control process by biasing the control by means of an actual analysis of the sidedraw for the concentration of the key light component. The assumption allows the elimination of an otherwise necessary analysis of the bottom stream for the content of the light key component. This constitutes a substantial advantage since analysis of the bottom stream in many cases is an unwanted and expensive procedure. The above given is reduced by these assumptions to $$\frac{B}{F} = \frac{100 - LK_F - LLK_F - KH_D}{100 - LK_{SD} - HK_D} - \frac{SD}{F}.$$

In this equation, and for the purposes of the control system of this invention, $LLK_F$ and $LK_F$ are inputs to the computer from a feed analyzer. SD/F generally are operator set conditions. With the sidedraw as the primary product, $LK_{SD}$ is the set point for the sidedraw composition control. In this embodiment, $HK_D$ is the input from an analyzer on the distillate stream representative of the concentration in percent of a heavy key component in the distillate stream. It is also within the scope of this invention to carry out the process so that the distillate stream is controlled. In this embodiment, then $HK_D$ is the set point for the overhead composition whereas $LK_{SD}$ is the input from the sidedraw stream analyzer representative of the concentration in volume percent of a light key component in the sidedraw stream.

The present invention is applicable to a variety of distillation column controls. Particularly preferred is the application of this invention to light hydrocarbon distillation columns. Examples for such distillation columns are depropanizers, deisobutanizers, and the like.

The present invention in accordance with another embodiment provides for a new apparatus for distilling of fluids having different boiling points. This apparatus comprises a regular distillation column equipped with a feed conduit, a sidedraw conduit, an overhead withdrawal conduit and a bottom withdrawal conduit and also with means for heating the bottom liquid in the column and with reflux means for condensing overhead vapors from the distillation column and reintroducing the condensed vapors into the distillation column as a reflux flow. The apparatus is equipped with first analysis means associated with the feed stream, second analysis means associated with the overhead stream and third analysis means associated with the sidedraw stream. Each of these three analysis means is designed to analyze the respective stream for the concentration of at least one of the components of the stream. The apparatus is further equipped with first, second and third flow detector means associated respectively with the feed stream, the reflux flow and the sidedraw stream. Each of these detector means is designed for measuring the flow of the respective streams. Computer means are provided for which are operatively connected to the analyzer means and to the flow rate detectors for automatically calculating a control signal. Manipulating means are provided for and associated with the computer to receive the control signal; the manipulating means are also connected to the distillation column for manipulating either the heat input into the fractionation column or the flow through the bottom withdrawal conduit or both.

In the preferred version of this second embodiment of the invention the apparatus is provided with a PID controller which is operatively connected to that analyzer of the stream which stream is to be kept an approximately constant composition. The output signal of the PID controller being representative of the deviation of the composition of this stream from the set point is connected to the computer means such as to bias a B/F signal which is calculated by the computer means essentially in accordance with the following formula $$\frac{B}{F} = \frac{100 - LK_F - LLK_F - HK_D}{100 - LK_{SD} - HK_D} - \frac{SD}{F}$$

wherein
B is the bottoms flow rate in volume/time,
F is the feed flow rate as determined by said first flow rate detector in volume/time,
SD is the sidedraw flow rate determined in accordance with said third flow rate detector in volume/time,
$LK_F$ is the volume percent concentration of a light key component in the feed stream determined by said first analysis means, $LLK_F$ is the volume percent concentration of a lighter than light key component in said feed stream as determined by said first analysis means, $HK_D$ is the volume percent concentration of a heavy key component of the distillate stream as determined by said second analysis means, $LK_{SD}$ is the volume percent concentration of a light key component in said sidedraw stream as determined by said third analysis means.

The presently preferred way of biasing the B/F signal calculated by the correspondingly computer means is to multiply the B/F signal, optionally after a dead time and second order lag modification, with the output signal from the PID controller.

FIG. 1 of the drawing shows a deisobutanizer 1. A feed stream F is introduced into this deisobutanizer 1 via a feed conduit 2. The flow rate in the feed conduit 2 is kept at a constant value by means of a flow rate controller 3 which operates a control valve 4 responsive to a signal from a flow detector 5. The flow rate controller 3 is provided with a set point input 6.

Overhead vapors are withdrawn from the deisobutanizer 1 via conduit 7. These overhead vapors are cooled in heat exchanger 8 and condensed in the condensor 9. A portion of the condensed vapors from the vessel 9 is reintroduced into the deisobutanizer via conduit 10. The flow rate through conduit 10 and thus the internal reflux rate is controlled by flow controller 11 receiving an input signal from the flow rate detector 12 as well as a set point input 13. The flow rate controller 11 manipulates control valve 14. The remaining fluid from the condensor vessel 9 is withdrawn via conduit 15 as the distillate flow D. The flow rate is controlled by control valve 16 which is manipulated by the level controller 17.

A bottoms stream is withdrawn from the deisobutanizer via conduit 18. The flow rate through the conduit 18 is controlled via control valve 19 which is manipulated by the level controller 20 opening the control valve 19 whenever the liquid level in the bottom of the deisobutanizer 1 rises above a certain level.

A portion of the bottoms liquids leaving the deisobutanizer via line 21 is reboiled in the reboiler 22 by means of indirect heat exchange with 150 psi steam introduced into the reboiler 22 via conduit 23. The flow of steam into the reboiler 22 is controlled by control valve 24 which in control is manipulated by the flow controller 25 responsive to the flow rate signal obtained from flow rate detector 26.

A sidedraw stream SD is withdrawn via conduit 27 from the deisobutanizer 1 at a level between the feed input and the bottoms withdrawal. The flow rate of the sidedraw stream SD is controlled by a control valve 28 which is manipulated by a flow controller 29 responsive to a flow rate signal from flow rate detector 30 and a set point signal 31.

It is to be noted that in this particular embodiment described both the feed flow rate, the reflux flow rate, and the sidedraw flow rate are controlled at a fixed set point. In this embodiment therefore the main input variable is the feed composition. By changing the heat input into the reboiler—as will be explained later—the composition of the sidedraw stream is controlled. Since all flow controllers have a certain range the actual flow rate of the various streams will, however, vary within these ranges. The computer inputs therefore use the actual flow rates rather than the set point for the flow rates for the actual calculations.

In the following description of the control system reference is made to both FIG. 1 and FIG. 2. Attention is drawn to the fact that FIG. 1 only shows those inputs to the reboiler heat computer 100 that constitute actually measured values, whereas in FIG. 2 both the actually measured values and the operator entered data are shown, together with the differentiating symbols.

An analyzer 200 analyzes the feed stream and generates two signals, one for the propane volume concentration and one for the isobutane volume concentration in the feed streem. These two signals are entered as the signals 201 and 202 respectively into the reboiler heat computer 100. The flow rate of the feed stream detected by flow rate detector 5 is entered into the computer 100 as signal 205.

Another analyzer 300 analyzes the composition of the sidedraw and generates a signal representative of the volume percent concentration of isobutane in the sidedraw. This signal 301 is also entered into the reboiler heat computer 100. The flow rate of the sidedraw stream SD is detected by the flow rate detector 30 and a corresponding signal 302 is entered into the computer 100.

The reflux flow determined by flow detector 12 is entered into the computer 100 as signal 401. In order to correct the measured reflux flow for its efficiency in the column the temperature of the overhead vapors is detected by a temperature measuring unit 410 whereas the temperature of the reflux stream is measured by a temperature measuring unit 420. Corresponding temperature signals 411 and 421 are entered into the reboiler heat computer 100.

An analyzer 400 determines the volume percent concentration of normal butane in the overhead condensed stream and submits a corresponding signal 431 to the reboiler heat computer 100.

The reboiler heat computer 100 computes a set point for the flow rate of the steam into the reboiler 22 and delivers this set point as the control signal 501 to the flow rate controller 25. The computation of the set point for the reboiler steam flow will be described in the following.

The reboiler heat computer calculates the steam flow set point signal 501 as being proportional to the volume of liquid to be evaporated.

Thus $F_S \alpha L - B$ wherein $F_S$ is the steam flow rate set point,

L is the flow rate of liquids entering the distillation column,

B is the flow rate of liquids leaving the distillation column, as the bottoms flow.

The symbols $\alpha$ is intended to indicate that there is a linear relationship between the left and the right side of the symbol.

The flow rate L of liquids into the distillation column is the sum of the internal reflux flow rate $R_I$ and the liquid portion of the feed flow rate F.Q. This summation is shown in FIG. 2 by the adding unit 101. Similarly the calculation $L_L - B_L$ is carried out in a summing unit 102. The signal $L_L - B_L$ is multiplied with a factor from a heat calculation subroutine 103 in which a variety of thermodynamic constants are entered into the computer to calculate a factor by which the flow rate unit signal $L_L - B_L$ has to be multiplied in order to generate the ultimate set point for the steam flow rate to the reboiler in the form of a set point signal 501. Since the heat calculation 103 is standard, a detailed description thereof can be avoided.

It should be noted that the internal reflux flow $R_I$ is computed by calculating a reflux factor in unit 104 whch takes into account the overhead temperature as well as the reflux temperature and thus represents the portion of the reflux flow entering the top of the column which actually reaches the main part of the column. The reflux factor calculated in unit 104 is then multiplied with the actual reflux flow in the multiplier 105 to result in the actual internal reflux signal $R_I$. This internal reflux signal $R_I$ is passed through two lag operations 106 and 107. Therefore the internal reflux flow rate $R_I$ is provided with a second order lag when the signal enters the summation unit 101.

The liquid portion of the feed flow rate F.Q is obtained by multiplying an operator entered feed quality signal having a value between zero and one in a multiplier 108 by the actual feed flow rate F, signal 205. The internal reflux signal $R_{IL}$ and the liquid feed flow F.Q are added in summation unit 101, to obtain a liquid input signal L. This signal L is then passed through two lag operations 119, 120, so that a signal representative of total liquid entering the column modified by a second order lag is obtained.

The value for the bottoms flow rate $B_L$ is calculated by multiplying a signal $(B/F)_L$ in a multiplier 109 by a modified feed flow rate signal. This modified feed flow rate signal is obtained by passing the feed flow rate signal 205 through a dead time unit 110, a first lag unit 111 and a second lag unit 112. Thus the modified feed flow signal $F_L$ is both delayed with respect to the feed flow rate signal 205 and modified with a second order lag when it is multiplied in multiplier 109 with the signal $(B/F)_L$.

The signal B/F is the most significant signal established in accordance with this invention. This B/F signal is obtained by calculating a value for B/F in a subroutine 113 in accordance with the formula $$\frac{B}{F} = \frac{100 - LK_F - LLK_F - HK_D}{100 - LK_{SD} - HK_D} - \frac{SD}{F}$$

wherein the symbols have the same meanings as shown above and wherein the symbols are also shown in the drawing in FIG. 2. As pointed out above, the calculation of B/F in subroutine 113 is inaccurate, but this inaccuracy is compensated by a bias applied in accordance with the actual determination of the isobutane content in the sidedraw. The B/F signal obtained from carrying out the calculation in accordance with the above formula, wherein $LK_F$ is the isobutane content in the feed, $LLK_F$ is the propane content in the feed, $HK_D$ is the normal butane content in the distillate stream, $LK_{SD}$ is the set point for the isobutane in the sidedraw, SD is the flow rate in the sidedraw line and F is the flow rate in the feed conduit, is modified by a dead time unit 114 followed by a sequence of two lag units 115 and 116. Thus a delayed B/F signal modified with a second order lag enters the multiplier 117. This modified B/F signal is multiplied by the output signal 130 from the PID controller 118. The input to the PID controller is the signal 301 representing the actual isobutane content in the sidedraw flow whereas the set point for this isobutane volume percent concentration in the sidedraw flow is operator entered into the PID controller.

The PID controller output signal 130 is the bias signal that is multiplicatively applied to the B/F signal as a bias to compensate for any feedforward errors such as deadtimes, lagtimes, and other process non-linearities, and to correct for the erroneous assumption that the volume percent concentration of a light key component in the sidedraw stream is the same as the volume percent concentration of a light key component in the bottoms stream.

The present invention does encompass a feed forward control scheme under which changes in the feed composition are detected and corrections to the reboiler steam flow are made by means of the B/F calculation and the following transformation into a steam flow rate set point signal without waiting for a change in the volume percent concentration of a light key component in the sidedraw stream to be detected.

It is presently preferred but for simplicity reasons not shown in the drawing to control the reflux of the distillation column by means of a slow-acting PID controller designed to maintain the content of the normal butane in this particular case at a constant value. In other words, $HK_D$ is preferably used to control the reflux flow rate by means of a slow-acting PID controller.

Reasonable variations and modifications which will become apparent to those skilled in the art can be made from this invention without departing from the spirit and scope thereof.

I claim:

1. In a fractionation distillation process comprising
   a. introducing a feed stream into a distillation column,
   b. withdrawing a side stream from said distillation column,
   c. withdrawing a bottom stream from said distillation column,
   d. withdrawing an overhead stream from said distillation column, the improvement comprising
   e. controlling the composition of the sidedraw stream or the overhead stream by
      aa. automatically establishing a predicting signal representative of the effect of changes in the rate and/or composition of the feed stream on the composition of the stream to be controlled,
      bb. automatically determining the deviation of said composition in said stream from a set point,
      cc. responsive to the determinations in aa and bb, automatically calculating a control signal,
      dd. responsive to said control signal manipulating the heat input to the distillation column.

2. Process of claim 1, wherein
   a. a B/F signal is established as said predicting signal, said B/F signal being representative of the ratio of bottom flow rate to feed flow rate necessary to maintain said composition of said stream,
   b. a sidedraw deviation signal representative of the deviation of the composition of the sidedraw stream from a composition set point is established,
   c. said B/F signal is multiplied with said sidedraw deviation signal to obtain a biased B/F signal,
   d. said biased B/F signal is converted into a control signal representative of the heat input flow rate necessary to maintain a bottom flow rate as represented by the biased B/F and the given feed flow rate and,
   e. the heat input into said distillation column is manipulated according to said control signal.

3. Process in accordance with claim 1, wherein
   a. the flow rate of the feed stream is measured, b. the composition of the feed stream is measured by determining the concentration of at least one ingredient of the feed stream,
c. the flow rate of the internal reflux is determined,
d. the flow rate of the sidedraw stream is measured,
e. the composition of the sidedraw stream is measured by determining the concentration of at least one ingredient of the sidedraw stream.

4. Process of claim 1, wherein said automatically establishing a predicting signal is carried out on the basis of a material balance of the liquid flow rates and the simplifying assumption that the liquid flow rate of a light key component in the bottom stream equals to the liquid flow rate of a light key component in the sidedraw.

5. Process of claim 1, wherein said establishing a predicting signal comprises automatically calculating the ratio of bottoms flow rate and feed flow rate from the feed composition, the distillate composition, the sidedraw composition and the flow rates of the sidedraw flow and the feed flow.

6. Process in accordance with claim 5 wherein a B/F signal representative of the ratio of the bottoms flow rate B to the feed flow rate F is calculated essentially with the formula $$\frac{B}{F} = \frac{100 - LK_F - LLK_F - HK_D}{100 - LK_{SD} - HK_D} - \frac{SD}{F}$$

wherein
B is the bottom flow rate in volume/time,
F is the feed flow rate in volume/time,
SD is the sidedraw flow rate in volume/time,
$LK_F$ is the volume percent concentration of a light key component in the feed stream,
$LLK_F$ is the volume percent concentration of a lighter than light key component in said feed stream,
$HK_D$ is the volume percent concentration of a heavy key component of the distillate stream,
$LK_{SD}$ is the volume percent concentration of a light key component in said sidedraw stream.

7. Process in accordance with claim 6 wherein said B/F signal is generated by modifying the ratio calculated by a dead time and a second order lag, wherein a feed flow signal F* is generated by modifying the actual feed flow value measured by a second dead time and a second, second order lag, wherein a liquid flow signal L is generated representative of the liquid flow reintroduced into the distillation column and wherein a heat set point signal is calculated which is essentially proportional to the difference between the product of said B/F signal and said signal F* minus said liquid flow signal L.

8. Process of claim 6 or 7 wherein said B/F signal is biased by multiplying it with a deviation signal representative of the deviation of the actual composition of the sidedraw stream from the corresponding set point.

9. A process in accordance with claim 7 wherein said deviation signal is obtained from the output of a PID controller receiving an analysis input signal representative of the analysis of said sidedraw stream and a set point.

10. Process of claim 6 wherein said heat set point signal is used for the set point of the heat input into a heater for the bottoms liquid of said distillation column.

11. Process of claim 1 wherein said distillation column is a fractionator for light hydrocarbons.

12. Process of claim 1 or 5 wherein said distillation column is a deisobutanizer.

13. Apparatus for distillation of fluids of different boiling points comprising
a. a distillation column equipped with
    aa. a feed conduit,
    bb. a sidedraw conduit,
    cc. an overhead withdrawal conduit,
    dd. a bottoms withdrawal conduit,
    ee. means for heating the bottom liquids in the column,
    ff. reflux means for condensing overhead vapor from the distillation column and reintroducing condensed vapor into the column as a reflux flow,
b. first analysis means for determining the composition of the feed stream by analyzing the feed stream for the concentration of at least one of the components of the feed stream,
c. second analysis means for analyzing the overhead stream for the concentration of at least one of the components of the overhead stream,
d. third analysis means for analyzing the sidedraw stream for the concentration of at least one of the components in the sidedraw stream,
e. first flow rate detector means for measuring the flow rate of the feed stream associated with the feed conduit,
f. second flow rate detector means for measuring the flow rate of the reflux,
g. third flow rate detector means for measuring the flow rate of the sidedraw,
h. computer means operatively connected to said first, second, and third analysis means and to said first, second and third flow rate detectors for automatically calculating a control signal,
i. manipulating means associated with
    aa. the computer to receive said control signal,
    bb. and the distillation column for manipulating the heat input to said distillation column.

14. Apparatus in accordance with claim 13, further comprising a PID controller operatively connected to the analyzer for the stream which is to be controlled and
wherein said computer means is programmed to calculate a B/F signal essentially in accordance with the formula $$\frac{B}{F} = \frac{100 - LK_F - LLK_F - HK_D}{100 - LK_{SD} - HK_D} - \frac{SD}{F}$$

wherein
B is the bottom flow rate in volume/time,
F is the feed flow rate as determined by said first flow rate detector in volume/time,
SD is the sidedraw flow rate determined in accordance with said third flow rate detector in volume/time,
$LK_F$ is the volume percent concentration of a light key component in the feed stream determined by said first analysis means,
$LLK_F$ is the volume percent concentration of a lighter than light key component in said feed stream as determined by said first analysis means,
$HK_D$ is the volume percent concentration of a heavy key component of the distillate stream as determined by said second analysis means, $LK_{SD}$ is the volume percent concentration of a light key component in said sidedraw stream as determined by said third analysis means, and wherein said computer means is operatively connected to said PID controller to receive the output signal representative of the deviation of the composition of the stream to be controlled and a set point and said computer means is programmed to bias said B/F by said PID controller output signal.

15. Apparatus in accordance with claim 14 wherein said computer means is programmed to bias said B/F signal by multiplying said PID controller output signal with said B/F signal.

16. In a fractionation distillation process comprising
  a. introducing a feed stream into a distillation column,
  b. withdrawing a side stream from said distillation column,
  c. withdrawing a bottom stream from said distillation column,
  d. withdrawing an overhead stream from said distillation column, the improvement comprising
  e. controlling the composition of the sidedraw stream or the overhead stream by
     aa. automatically establishing a predicting signal representative of the effect of changes in the rate and/or composition of the feed stream on the composition of the stream to be controlled,
     bb. automatically determining the deviation of said composition in said stream from a set point,
     cc. responsive to the determinations in aa and bb, automatically calculating a control signal,
     dd. responsive to said control signal manipulating the flow of bottom stream from the distillation column.

17. In a fractionation distillation process comprising
  a. introducing a feed stream into a distillation column,
  b. withdrawing a side stream from said distillation column,
  c. withdrawing a bottom stream from said distillation column,
  d. withdrawing an overhead stream from said distillation column, the improvement comprising
  e. controlling the composition of the sidedraw stream or the overhead stream by
     aa. automatically establishing a predicting signal representative of the effect of changes in the rate and/or composition of the feed stream on the composition of the stream to be controlled,
     bb. automatically determining the deviation of said composition in said stream from a set point,
     cc. responsive to the determinations in aa and bb, automatically calculating a control signal,
     dd. responsive to said control signal manipulating both
        aaa. the heat input to the distillation column, and
        bbb. the flow of the bottom stream from the distillation column.

18. Apparatus for distillation of fluids of different boiling points comprising
  a. a distillation column equipped with
     aa. a feed conduit,
     bb. a sidedraw conduit,
     cc. an overhead withdrawal conduit,
     dd. a bottoms withdrawal conduit,
     ee. means for heating the bottom liquids in the column,
     ff. reflux means for condensing overhead vapor from the distillation column and reintroducing condensed vapor into the column as a reflux flow,
  b. first analysis means for determining the composition of the feed stream by analyzing the feed stream for the concentration of at least one of the components of the feed stream,
  c. second analysis means for analyzing the overhead stream for the concentration of at least one of the components of the overhead stream,
  d. third analysis means for analyzing the sidedraw stream for the concentration of at least one of the components in the sidedraw stream,
  e. first flow rate detector means for measuring the flow rate of the feed stream associated with the feed conduit,
  f. second flow rate detector means for measuring the flow rate of the reflux,
  g. third flow rate detector means for measuring the flow rate of the sidedraw,
  h. computer means operatively connected to said first, second, and third analysis means and to said first, second and third flow rate detectors for automatically calculating a control signal,
  i. manipulating means associated with
     aa. the computer to receive said control signal, and
     bb. the distillation column for manipulating the flow rate through said bottom withdrawal conduit.

19. Apparatus for distillation of fluids of different boiling points comprising
  a. a distillation column equipped with
     aa. a feed conduit,
     bb. a sidedraw conduit,
     cc. an overhead withdrawal conduit,
     dd. a bottoms withdrawal conduit,
     ee. means for heating the bottom liquids in the column,
     ff. reflux means for condensing overhead vapor from the distillation column and reintroducing condensed vapor into the column as a reflux flow,
  b. first analysis means for determining the composition of the feed stream by analyzing the feed stream for the concentration of at least one of the components of the feed stream,
  c. second analysis means for analyzing the overhead stream for the concentration of at least one of the components of the overhead stream,
  d. third analysis means for analyzing the sidedraw stream for the concentration of at least one of the components in the sidedraw stream,
  e. first flow rate detector means for measuring the flow rate of the feed stream associated with the feed conduit,
  f. second flow rate detector means for measuring the flow rate of the reflux,
  g. third flow rate detector means for measuring the flow rate of the sidedraw,
  h. computer means operatively connected to said first, second, and third analysis means and to said first, second and third flow rate detectors for automatically calculating a control signal,
  i. manipulating means associated with
     aa. the computer to receive said control signal,
     bb. and the distillation column for manipulating both
        1. the heat input to said distillation column, and
        2. the flow rate through said bottom withdrawal conduit.

* * * * *

UNITED STATES PATENT AND TRADEMARK OFFICE
CERTIFICATE OF CORRECTION

PATENT NO. : 4,348,259
DATED : September 7, 1982
INVENTOR(S) : Bruce A. Jensen

It is certified that error appears in the above—identified patent and that said Letters Patent is hereby corrected as shown below:

Claim 2, col. 8, line 49, following the term "claim 1,"
    insert --- 16 or 17 ---.

Claim 3, col. 8, line 67, following the term "claim 1,"
    insert --- 16 or 17 ---.

Claim 4, col. 9, line 9, following the term "claim 1,"
    insert --- 16 or 17 ---.

Claim 5, col. 9, line 16, following the term "claim 1,"
    insert --- 16 or 17 ---.

Claim 11, col. 9, line 67, following the term "claim 1"
    insert --- , 16 or 17 ---.

Claim 14, col. 10, line 41, following the term "claim 13,"
    insert --- 18 or 19 ---.

Signed and Sealed this

Ninth Day of November 1982

[SEAL]

Attest:

GERALD J. MOSSINGHOFF

Attesting Officer     Commissioner of Patents and Trademarks